United States Patent [19]

Wolfe et al.

[11] Patent Number: 5,102,611
[45] Date of Patent: Apr. 7, 1992

[54] PROCESS FOR MAKING SMOOTH PLASTIC TUBING

[75] Inventors: Al R. Wolfe; David R. Battiste, both of Bartlesville; Harry E. Straw, Lenapah, all of Okla.

[73] Assignee: Phillips Petroleum Company, Bartlesville, Okla.

[21] Appl. No.: 525,420

[22] Filed: May 18, 1990

[51] Int. Cl.⁵ .................... B29C 47/90; B29L 23/22
[52] U.S. Cl. ......................... 264/568; 264/571; 264/209.4; 264/210.6; 264/211.13; 264/211; 264/DIG. 78; 264/101
[58] Field of Search ............. 264/209.4, 210.6, 211, 264/101, 209.3, 568, 571, 211.13, DIG. 78; 524/528; 525/240

[56] References Cited

U.S. PATENT DOCUMENTS

| | | | |
|---|---|---|---|
| 2,996,466 | 8/1961 | Kessler et al. | 264/211 |
| 3,169,272 | 2/1965 | Maxson | 264/209.4 |
| 3,776,806 | 12/1973 | Mayer et al. | 264/211 |
| 4,190,624 | 2/1980 | Alard et al. | 264/211 |
| 4,374,227 | 2/1983 | Michie, Jr. | 524/528 |
| 4,385,143 | 5/1983 | Yachiao et al. | 524/101 |
| 4,539,355 | 9/1985 | Takahashi et al. | 524/131 |
| 4,810,579 | 3/1989 | Neri et al. | 428/405 |
| 4,829,110 | 5/1989 | Asbroeck et al. | 524/81 |
| 4,829,112 | 5/1989 | Ishil | 524/108 |
| 4,853,426 | 8/1989 | Chatterjee | 524/100 |

FOREIGN PATENT DOCUMENTS

| | | | |
|---|---|---|---|
| 58-15549 | 1/1983 | Japan | 524/528 |
| 60-84345 | 5/1985 | Japan | 264/211 |

*Primary Examiner*—Jeffery Thurlow
*Assistant Examiner*—Mathieu Vargot
*Attorney, Agent, or Firm*—Edward L. Bowman

[57] ABSTRACT

A process for forming plastic tubing which involves extruding a molten plastic composition through a die which produces an extended length of plastic tubing, passing the hot tubing through a vacuum sizing tube wherein the wall of the tubing is sized by being drawn to the wall of the sizing tube by a vacuum, and cooling the sized tubing so that the tubing will be self-supporting at normal ambient temperatures, wherein the plastic composition contains a phosphorus-containing additive in an amount sufficient to cause an improvement in the smoothness of the interior of said tubing.

19 Claims, No Drawings

PROCESS FOR MAKING SMOOTH PLASTIC TUBING

FIELD OF THE INVENTION

The present invention relates to plastic tubing, especially plastic tubing generally referred to as plastic pipe. In another aspect the present invention relates to a process for making plastic pipe having a relatively smooth interior surface.

BACKGROUND OF THE INVENTION

There are numerous methods know in the art for producing tubing, i.e. generally tubular extended lengths, from thermoplastics materials. In many cases the presence of surface imperfections, either on the exterior or interior surface, can lead to flaws which can render the tubing unsuitable for certain application. For example, grooves formed in plastic pipe in some cases result in the weakening of the pipe so that it may not be capable of withstanding internal or external forces that may be applied to it. Accordingly, the interior and exterior smoothness of plastic tubing is a factor that consumers generally consider when evaluating such products. In fact consumers will in some cases select one product over the other as a result of minor differences in the interior smoothness of the tubing, even though those differences in smoothness would not lead to any significant difference in the performance properties of the tubing.

Since the exterior of the tubing is generally in contact with suitably shaped metal during the cooling of the extruded tubing, the exterior is generally smooth. The same is not necessarily true for the interior of the tubing. In the formation of plastic tubing in which the extrudate is subjected to vacuum sizing, wherein the interior of the tubing is not exposed to a device which would polish the interior of the tubing as it is cooled, it has been noted that in some cases the interior of the tubing is not as smooth as would be desired.

An object of the present invention is to provide a method for improving the smoothness of a plastic tubing that is formed in a process in which the interior of plastic tubing is not exposed to a device which polishes the interior of the tubing when the pipe is being cooled.

Another object of the present invention is to provide a method of forming tubing having a relatively smooth internal surface without the use of a device which polishes the interior of the tubing as the tubing is cooled.

Still another object of the present invention is to provide plastic tubing having a smooth interior surface.

Other aspects, objects, and advantages of the present invention will be apparent from the following disclosure.

SUMMARY OF THE INVENTION

In accordance with the present invention there is provided a method for forming a tubing having a relatively smooth internal surface without the use of a device which polishes the interior of the tubing as the tubing is cooled. The method is an improvement in the process wherein a plastic tubing is formed by extruding a molten plastic composition through a die to produce an extended length of plastic tubing and cooling the tubing so the tubing will be capable of retaining the desired shape, i.e. the tubing will be self-supporting under normal ambient temperatures. The improvement comprises including in said plastic composition a phosphorus-containing additive in an amount sufficient to improve the smoothness of the interior of the cooled tubing.

Further in accordance with the present invention there is provided the pipe produced by such a process.

DETAILED DESCRIPTION OF THE INVENTION

The present invention is considered to be applicable to thermoplastic material which can be formed into tubing. Currently some of the most preferred thermoplastic materials used in making tubing and pipe are polyvinyl chloride and polyolefins. Polymers of ethylene are particularly useful. The term polymers of ethylene is used herein to refer to those polymer formed from monomers consisting essentially of ethylene. Accordingly, polyethylene homopolymers and copolymers of ethylene and minor amounts of alpha olefins having 3-8 carbon atoms per molecule are included within the definition of polymers of ethylene. Blends of polymers of ethylene are also within the scope of the polymers that can be used in making plastic tubing in accordance with the present invention. Other thermoplastic polymers include polyphenylene sulfide, polyphenylene sulfide sulfone, poly 4-methyl-1-pentene, polypropylene, etc.

A wide range of phosphorus-containing antioxidants are known in the art. A few examples of such antioxidants are disclosed in U.S. Pat. Nos. 4,539,355; 4,829,112; and 4,810,579, the disclosures of which are incorporated herein by reference. One typical class of such antioxidants are the organic phosphites of the formula

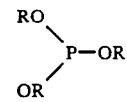

wherein each R is individually selected from the group consisting of substituted or unsubstituted alkyl, aryl, cycloalkyl, alkaryl, and aryalkyl radicals, having 1 to 18 carbon atoms, more typically 6 to 18 carbon atoms. A currently preferred group of phosphites are those in which each R is an alkyl substituted phenyl group having 7 to 18 carbon atoms. Some specific phosphites of that group include tris (2,5-di-tert-butylphenyl)phosphite, tris (2-tert-butylphenyl)phosphite, tris (2,4-bis(1,1-dimethylpropyl)-phenyl)phosphite, tris(nonyl phenyl)-phosphate and tris (2,4-di-tert-butylphenyl)phosphite.

Another type of phosphite has the general formula

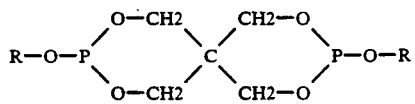

wherein each R is individually selected from the group consisting of substituted or unsubstituted alkyl, aryl, cycloalkyl, alkaryl, and arylalkyl radicals, having 1 to 18 carbon atoms, more typically 6 to 18 carbon atoms. Some specific examples of such diphosphite compounds include dilauryl pentaerythritol diphosphite, distearyl pentaerythritol diphosphite, bis (2,5-di-tert-butylphenyl) pentaerythritol diphosphite, and bis (2,4-di-tert-butylphenyl) pentaerythritol diphosphite.

The amount of phosphorus-containing additive needed to provide an improvement in the smoothness of the interior of the plastic tubing can vary depending upon the conditions employed and the specific type of polymer or polymers employed in the plastic composition. As a general rule the phosphorus-containing additive would be employed in an amount of at least about 0.1 weight percent based on the weight of polymer in said plastic composition, more often an amount of at least about 0.2 weight percent would be employed. The upper limit would generally be determined by giving consideration as to whether higher amounts are providing any further improvement in the smoothness of the interior of the tubing or whether higher amounts are providing additional desired benefits such as improved protection from the effects of light, heat, and oxygen. Generally, the upper limit will be about 2.0 weight percent, more preferably 0.5 weight percent.

It should be noted that it is within the scope of the present invention to include in the plastic composition other additives that are conventionally used in making such plastic tubing. Examples include other antioxidants, UV stabilizers, colorants, and the like.

A further understanding of the present invention and its benefits and advantages will be provided by the following examples which illustrate certain embodiments of the invention. In the following examples pipes were produced from ethylene polymers using the vacuum sizing technique. The vacuum sizing technique involves extruding a molten plastic composition through a die which produces an extended length of plastic tubing, passing the hot tubing through a vacuum sizing tube wherein the wall of the tubing is sized by being drawn to the wall of the sizing tube by a vacuum, and cooling the sized tubing so that said tubing will be self-supporting at normal ambient temperatures. In each specific example the extrusion and sizing conditions were kept the same so that any differences in pipe appearance could be established to be due to differences in the pipe recipe.

EXAMPLE I

A series of pipes were prepared from polyethylene having density of about 0.943 and a melt index of about 0.165 grams/10 min. The series of pipes was prepared to determine the effects of various additives on the smoothness of the interior of the pipe. The additives evaluated included Irganox 1010, an antioxidant obtained from Ciba-Geigy which is believed to consist essentially of tetrakis(methylene (3,5-di-tert-butyl-4-hydroxyhydrocinamate) methane; Ultranox 626, which is considered to consist essentially of bis(2,4-di-tert-butylphenyl)-pentaerythritol diphosphite; and Irgafos 168, which is considered to consist essentially of tris (2,4-di-tert-butylphenyl)phosphite. The results are summarized in Table I.

TABLE 1

| Run | Additive, wt. % | ID "Feel" | Smoothness Test* ID | OD |
|---|---|---|---|---|
| 1 | Irganox 1010, 0.1 | Very Rough | >250 | >200 |
| 2 | Irgafos 168, 0.2 | Smooth | 80 | 60 |
| 3 | Ultranox 626, 0.2 | Smooth | 50 | 35 |

*Units on the smoothness test are microinches.

This data shows that the phosphorus-containing materials, Irgafos 168 and Ultranox 626 at the level of 0.2 wt %, based on the weight of the polyethylene, provide an improvement in the smoothness of pipe produced using a vacuum sizing process.

EXAMPLE 2

The results obtained in the previous example were considered to be particularly surprising in that an orange colored pipe had been produced before which contained Irgafos 168 and yet the pipe has a much rougher internal surface than that observed with run 2 of Example 1. The orange colored pipe was produced using polyethylene having a density of about 0.938 and a melt index of about 0.19. The weight percent of Irgafos 168 used was only 0.05 weight percent.

In view of the results of Example 1 it is concluded that if the level of Irgafos 168 was increased one could have obtained a pipe having a smoother internal surface with this recipe.

EXAMPLE 3

Another series of pipes were prepared using variations of an orange colored pipe recipe. The pipe was prepared using the same type of polyethylene used in the preceding example. The basic recipe used in these runs was as follows:

| Additive | Wt % |
|---|---|
| Butylated hydroxy toluene | 0.02 |
| Santonox | 0.05 |
| Ethanox 330 | 0.08 |
| Chimassorb 944 | 0.15 |
| Zirconium Oxide | 0.001 |
| Cadmium CP-2240 Orange Pigment | 0.075 |

Three variations of this recipe were evaluated. In two runs additional additives were employed. The amounts of the additives are based on the weight of the polyethylene. The results are summarized in the following Table.

TABLE 3

| Additive | ID "Feel" |
|---|---|
| No extra additive | Rough |
| 0.1 wt. % Irganox 1010, 0.2 wt. % Ultranox 626 | Smooth |
| 0.1 wt. % Irganox 1010, 0.2 wt. % Irgafos 168 | Smooth |

This data confirms that if the level of the Ultranox 626 or the Irgafos 168 is high enough either can provide an improvement in the internal smoothness of polyethylene pipe produced using a vacuum sizing technique.

EXAMPLE 4

To further evaluate the effects of the phosphorus antioxidants additional runs were made using still another pipe recipe. In this case the polyethylene was the same as in Example 1. The basic recipe was as follows:

| Additives | Wt. % |
|---|---|
| Butylated hydroxy toluene | 0.04 |
| Irganox 1076 | 0.12 |
| Agerite White | 0.1 |
| Carbon Black (N550) | 2.60 |

This recipe was evaluated with and without the addition of a phosphorus-containing additive. The results are summarized in Table 4.

TABLE 4

| Additive | ID "Feel" |
| --- | --- |
| No extra additive | Rough |
| 0.1 wt. % Irganox 1010, 0.2 wt. % Ultranox 626 | Smooth |

This again demonstrates that at effective levels a phosphorus-containing additive can improve the internal smoothness of plastic pipe.

EXAMPLE 5

In order to further evaluate the effects of different additives on the smoothness of pipe another series of pipes were prepared. In these runs a polyethylene was employed having density of about 0.943 and a melt index of about 0.165. About 0.02 weight percent butylated hydroxy toluene and 0.1 Agerite White and 2.6% Carbon Black (N550) was added in each recipe. The other additives used and the results obtained are set forth in Table 5.

TABLE 5

| Additive | ID "Feel" |
| --- | --- |
| No extra Additive | Rough |
| 0.1 wt. % Irganox 1010, 0.20 wt. % Ultranox 626, and 0.1 wt. % dilauryl thiodipropionate | Smooth |
| 0.1 wt. % Irganox 1010, 0.20 wt. % Ultranox 626 | Smooth |
| 0.1 wt. % Irganox 1010, 0.20 wt. % Irgafos 168 | Smooth |
| 0.2 wt. % Ethanox 330 | Rough |

This data again demonstrates that at higher levels the phosphorus-containing antioxidants can improve the internal smoothness of plastic pipe. Note that even high levels of the Ethanox 330, a hindered phenol type antioxidant, was not effective in improving the internal smoothness of the pipe.

EXAMPLE 6

The invention is also applicable to the formation of plastic pipe using blends of ethylene homopolymer and an ethylene copolymer. An example of such a composition which exhibits improved internal smoothness as a result of the phosphorus-containing additive has been prepared by using a blend of a polyethylene and an ethylene/hexene copolymer. The blend had a natural density around 0.950 and melt index around 0.15 g/10 min. The additives employed were as follows:

| Additive | Wt. % |
| --- | --- |
| Irganox 1010 | 0.1 |
| Carbon Black (N550) | 2.6 |
| Irgafos 168 | 0.2 |
| Calcium Stearate | 0.04 |
| DLTDP | 0.1 |

The invention has now been described in broad terms and some specific embodiments have been illustrated. It should be recognized, however, that many variations and modifications can be made which will fall within the scope of the present invention.

That which is claimed is:

1. In a process for forming a plastic tubing wherein a molten plastic composition is extruded through a die to produce an extended length of plastic tubing and cooling the tubing so the tubing will be capable of retaining the desired shape, the improvement comprising forming a tubing having a relatively smooth internal surface without the use of a device which polishes the interior of the tubing as the tubing is cooled by including in said plastic composition an additive consisting essentially of a phosphite in an amount sufficient to improve the smoothness of the interior of the cooled tubing, the total amount of antioxidant in said plastic composition, including said phosphite being greater than 0.20 weight percent based on the weight of the polymer contained in said plastic composition.

2. A process according to claim 1 wherein said phosphite additive is selected from the group consisting of tris (alkyl substituted phenyl) phosphites and bis (alkyl substituted phenyl) pentaerythritol diphosphites.

3. A process according to claim 2 wherein said alkyl substituted phenyl groups of said phosphite additive are individually selected from those having 7 to 18 carbon atoms.

4. A process according to claim 3 wherein said alkyl substituted phenyl groups of said phosphite additive are dialkyl substituted phenyl groups.

5. A process according to claim 4 wherein said phosphite additive consists essentially of tris (2,4-di-tert-butylphenyl) phosphite.

6. A process according to claim 5 wherein the polymer of said plastic composition consists essentially of a polymer formed from monomers consisting essentially of ethylene.

7. A process according to claim 6 wherein the amount of tris (2,4-di-tert-butylphenyl) phosphite included in said plastic composition is at least about 0.1 weight percent based on the weight of polymer contained in said plastic composition.

8. A process according to claim 6 wherein the amount of tris (2,4-di-tert-butylphenyl) phosphite included in said plastic composition is at least about 0.2 weight percent based on the weight of polymer contained in said plastic composition.

9. A process according to claim 8 wherein the polymer of said plastic composition is selected from the group consisting of homopolymers of ethylene and copolymers of ethylene and minor amounts of alpha olefins having 3 to 8 carbon atoms per molecule.

10. A process according to claim 3 wherein said phosphite additive consists essentially of bis (2,4-di-tert-butylphenyl)pentaerythritol diphosphite.

11. A process according to claim 9 wherein the polymer of said plastic composition consists essentially of a polymer formed from monomers consisting essentially of ethylene.

12. A process according to claim 11 wherein the amount of bis (2,4-di-tert-butylphenyl)pentaerythritol diphosphite included in said plastic composition is at least about 0.1 weight percent based on the weight of polymer contained in said plastic composition.

13. A process according to claim 11 wherein the amount of bis (2,4-di-tert-butylphenyl)pentaerythritol diphosphite included in said plastic composition is at least about 0.2 weight percent based on the weight of polymer contained in said plastic composition.

14. A process according to claim 13 wherein the polymer of said plastic composition is selected from the group consisting essentially of homopolymers of ethylene and copolymers of ethylene and minor amounts of alpha olefins having 3 to 8 carbon atoms per molecule.

15. A process according to claim 4 wherein the polymer of said plastic composition consists essentially of a polymer formed from monomers consisting essentially of ethylene.

16. A process according to claim 2 wherein the polymer of said plastic composition consists essentially of a polymer formed from monomers consisting essentially of ethylene.

17. A process for forming plastic tubing comprising extruding a molten plastic composition through a die which produces an extended length of plastic tubing, passing the hot tubing through a vacuum sizing tube wherein the wall of the tubing is sized by being drawn to the wall of the sizing tube by a vacuum, and cooling the sized tubing so that said tubing will be self-supporting at normal ambient temperatures, the improvement comprising forming a tubing having a relatively smooth internal surface without the use of a device which polishes the interior of the tubing as the tubing is cooled by including in said plastic composition an additive consisting essentially of a phosphite in an amount sufficient to cause an improvement in the smoothness of the interior of said tubing, the total amount of antioxidant in said plastic composition including said phosphite being greater than 0.20 weight percent based on the weight of the polymer contained in said plastic composition.

18. A process according to claim 17 wherein said phosphorus-containing additive is selected from the group consisting of bis(2,4-di-tert-butylphenyl)pentaerythritol diphosphite and tris(2,4-di-tert-butylphenyl) phosphite.

19. In a process for forming a plastic tubing wherein a molten plastic composition is extruded through a die to produce an extended length of plastic tubing and cooling the tubing so the tubing will be capable of retaining the desired shape, the improvement comprising forming a tubing having a relatively smooth internal surface without the use of a device which polishes the interior of the tubing as the tubing is cooled, by including in said plastic composition an additive consisting essentially of a phosphite in an amount sufficient to improve the smoothness of the interior of the cooled tubing, said phosphite additive being included in an amount of at least 0.2 weight percent based on the weight of polymer contained in said plastic composition, said plastic composition further containing about 0.1 weight percent of tetrakis (methylene(3,5-di-tert-butyl-4-hydroxyhydrocinamate) methane, based on the weight of polymer in said plastic composition.

* * * * *